(12) United States Patent
Baldwin (10) Patent No.: US 10,255,418 B2
(45) Date of Patent: *Apr. 9, 2019

(54) METHOD AND APPARATUS FOR MANAGING MULTIPLE MEDIA SERVICES

(71) Applicant: AT&T Intellectual Property I, L.P., Atlanta, GA (US)

(72) Inventor: Christopher Baldwin, Algonquin, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,665

(22) Filed: Aug. 31, 2017

(65) Prior Publication Data

US 2017/0372053 A1 Dec. 28, 2017

Related U.S. Application Data

(63) Continuation of application No. 14/923,472, filed on Oct. 27, 2015, now Pat. No. 9,846,770, which is a (Continued)

(51) Int. Cl.
*G06F 21/32* (2013.01)
*H04N 21/258* (2011.01)
(Continued)

(52) U.S. Cl.
CPC .............. *G06F 21/32* (2013.01); *G06F 21/40* (2013.01); *G06Q 20/123* (2013.01);
(Continued)

(58) Field of Classification Search
CPC ......... G06F 17/30489; G06F 17/30752; G06F 17/30867; G06F 3/0484; G06F 17/30265; G06F 17/30699; G06F 17/30247; G06F 17/30749; G06F 17/30041; G06F 17/30657; G06F 17/3089; G06F 19/322; G06F 21/6245; G06F 3/013; G03G 15/6517; G01C 21/3664; G01C 21/3673; G06K 9/00442; G06K 9/036; G06K 9/629; G06K 9/32; G06K 9/6293; H04N 2201/3233;
(Continued)

(56) References Cited

U.S. PATENT DOCUMENTS 6,606,744 B1 * 8/2003 Mikurak ................. H04L 29/06
717/174
6,640,238 B1 * 10/2003 Bowman-Amuah ... G06F 9/541
709/201

(Continued)

*Primary Examiner* — Aklilu K Woldemariam
(74) *Attorney, Agent, or Firm* — Guntin & Gust PLC; Atanu Das (57) ABSTRACT

A system that incorporates teachings of the subject disclosure may include, for example, obtaining a group of facial objects detected from an image captured by a camera coupled with a media device where the facial objects correspond to a plurality of users, determining authentication information for each of the plurality of users based on the facial objects, and providing the authentication information to a group of content service systems for enabling the media device to access aggregated media services from the group of content service systems. Other embodiments are disclosed.

20 Claims, 7 Drawing Sheets

Related U.S. Application Data continuation of application No. 13/686,059, filed on Nov. 27, 2012, now Pat. No. 9,286,456.

(51) Int. Cl.

| | | |
|---|---|---|
| *H04N 21/4223* | (2011.01) | |
| *H04N 21/44* | (2011.01) | |
| *H04N 21/472* | (2011.01) | |
| *G06F 21/40* | (2013.01) | |
| *G06Q 20/12* | (2012.01) | |
| *G06Q 20/40* | (2012.01) | |
| *H04H 60/45* | (2008.01) | |
| *H04N 21/658* | (2011.01) | |
| *H04N 21/254* | (2011.01) | |
| *H04N 21/2543* | (2011.01) | |
| *H04N 21/442* | (2011.01) | |
| *H04N 21/454* | (2011.01) | |
| *G06K 9/00* | (2006.01) | |
| *H04H 20/10* | (2008.01) | |

(52) U.S. Cl.
CPC ....... *G06Q 20/40145* (2013.01); *H04H 60/45* (2013.01); *H04N 21/2541* (2013.01); *H04N 21/2543* (2013.01); *H04N 21/25875* (2013.01); *H04N 21/4223* (2013.01); *H04N 21/44008* (2013.01); *H04N 21/44245* (2013.01); *H04N 21/454* (2013.01); *H04N 21/47202* (2013.01); *H04N 21/47211* (2013.01); *H04N 21/6582* (2013.01); *G06K 9/00* (2013.01); *H04H 20/103* (2013.01)

(58) Field of Classification Search
CPC ....... H04N 2201/3271; H04N 21/4828; H04N 21/4415; H04N 21/854; H04L 67/32; H04L 29/06027; H04L 63/0861; H04M 15/00; H04M 15/57; H04M 7/12; G06Q 10/10; G06Q 50/01; G06Q 30/0269; G06Q 20/3674; G11B 27/11; G11B 27/34; G11B 20/00181; H04Q 2213/13248; H04Q 3/72
USPC ........ 382/118; 707/736, 722, 610, 706, 640, 707/674
See application file for complete search history.

(56) References Cited

U.S. PATENT DOCUMENTS

| | | | | |
|---|---|---|---|---|
| 6,909,708 | B1* | 6/2005 | Krishnaswamy | ... H04L 12/1813 370/352 |
| 7,548,915 | B2* | 6/2009 | Ramer | ............. G06F 17/30867 705/14.54 |
| 7,769,757 | B2* | 8/2010 | Grefenstette | ..... G06F 17/30867 707/713 |
| 7,805,377 | B2* | 9/2010 | Felsher | ................. G06F 19/328 705/64 |
| 7,885,955 | B2* | 2/2011 | Hull | .................. G06K 9/00442 707/722 |
| 8,194,940 | B1* | 6/2012 | Kiyohara | .......... G06F 17/30029 382/118 |
| 2004/0107125 | A1* | 6/2004 | Guheen | .................. G06Q 50/01 705/319 |
| 2008/0048044 | A1* | 2/2008 | Zhao | ........................ G06K 7/14 235/494 |
| 2008/0235595 | A1* | 9/2008 | Krantz | ................. G11B 27/036 715/741 |
| 2010/0066647 | A1* | 3/2010 | Tatsuta | .................... G06F 3/147 345/30 |
| 2010/0070490 | A1 | 3/2010 | Amidon et al. | |
| 2010/0125569 | A1* | 5/2010 | Nair | .................. G06F 17/30864 707/722 |
| 2010/0191728 | A1* | 7/2010 | Reilly | ............... G06F 17/30265 707/736 |
| 2010/0211558 | A1* | 8/2010 | Bonabeau | ......... G06F 17/30864 707/706 |
| 2011/0067066 | A1* | 3/2011 | Barton | ............... G06Q 30/0244 725/46 |
| 2011/0078620 | A1* | 3/2011 | Chiou | ................. G06K 7/10722 715/781 |
| 2011/0107379 | A1* | 5/2011 | Lajoie | ................. H04L 65/1016 725/87 |
| 2011/0131180 | A1* | 6/2011 | Tuli | ................... G06F 17/30053 707/610 |
| 2011/0258049 | A1* | 10/2011 | Ramer | ............. G06F 17/30867 705/14.66 |
| 2011/0290871 | A1* | 12/2011 | Jon | ................... G06F 17/30879 235/375 |
| 2012/0200689 | A1 | 8/2012 | Friedman et al. | |
| 2012/0209840 | A1* | 8/2012 | Gur | ................... G06F 17/30389 707/733 |
| 2012/0278393 | A1 | 11/2012 | Svendsen et al. | |
| 2012/0303710 | A1* | 11/2012 | Roberts | .................. G06Q 50/01 709/204 |
| 2012/0314917 | A1* | 12/2012 | Kiyohara | .......... G06F 17/30029 382/118 |
| 2013/0036458 | A1* | 2/2013 | Liberman | ............. H04L 9/3231 726/6 |
| 2013/0054576 | A1* | 2/2013 | Karmarkar | ........ G06F 17/30861 707/722 |
| 2013/0182918 | A1* | 7/2013 | Kovtun | ............. G06K 9/00288 382/118 |
| 2014/0074824 | A1* | 3/2014 | Rad | ........................ G06Q 50/01 707/722 |

\* cited by examiner

FIG. 7

METHOD AND APPARATUS FOR MANAGING MULTIPLE MEDIA SERVICES

CROSS REFERENCE TO RELATED APPLICATION

This application is a continuation of U.S. patent application Ser. No. 14/923,472, filed Oct. 27, 2015, which is a continuation of U.S. patent application Ser. No. 13/686,059, filed Nov. 27, 2012, now U.S. Pat. No. 9,286,456, which are incorporated herein by reference in their entirety.

FIELD OF THE DISCLOSURE

The subject disclosure relates to a method and apparatus for managing multiple media services.

BACKGROUND

Contract based streaming service providers and cable service providers typically require unique user ID's and passwords to gain access to content. As the number of available content sources continues to grow, this could result in a single user having several passwords and logins for different content sources which may inhibit the user's ability to access content from locations other than the user's home.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments which enable users to take their media service access with them for use at any location using any devices, which may or may not be associated with the users. In one or more embodiments, image pattern recognition can be used for authenticating a user (e.g., based on facial objects) to allow the user to access his or her services remotely or can be used for authenticating multiple users for generating an aggregated media services. In one or more embodiments, the aggregated media services can be generated based on authentication of multiple users at a single location where the multiple users are associated with multiple content service systems. In one or more embodiments, apportioned billing can be generated for the aggregated media services.

In one or more embodiments, a media device connected with a camera can capture one or more images of users in a viewing area and can send these images (or extracted facial objects from the images) to a translation system, which can be a remote server or other device. The translation system can identify content service systems associated with each facial object and can send a user ID and password for each content service systems for each user to a media center/content aggregator of the media device. The media center/content aggregator can use the IDs and passwords to access the content of each service. In one or more embodiments, the media center/content aggregator of the media device can combine available content from multiple content service systems and can present the available content for selection in a single user interface. In this example, when a particular movie or other media content is selected, the media center/content aggregator can initiate a content stream from an appropriate content service system.

In one or more embodiments, when media services are available from two different sources (e.g., video-on-demand content for different service providers having different available movies), a selection menu can display the services to simplify a selection, and the services can be selected from a desired source. The selection can be based on user input and/or can be based on other factors including an analysis of image quality, streaming quality, and relationships between content sources and the network provider (e.g., billing or data usage arrangements, limits on user accounts), and so forth.

One embodiment of the subject disclosure includes a server having a memory to store computer instructions, and a processor coupled with the memory. The processor, responsive to executing the computer instructions, performs operations including obtaining a group of facial objects detected from an image captured by a camera coupled with a media device, where the image is captured of a viewing area of the media device, where the viewing area includes a plurality of users, and where the facial objects correspond to the plurality of users. The processor can determine identification information for each of the plurality of users based on the facial objects and can identify a group of content service systems associated with subscription plans for the plurality of users based on the identification information. The processor can determine authentication information for each of the plurality of users based on the identification information and can provide the authentication information to the group of content service systems for enabling access to a group of media services from the group of content service systems. The processor can filter out redundant media services among the group of media services to generate aggregated media services. The filtering can include choosing a selected redundant media service from among the redundant media services for inclusion in the aggregated media services based on satisfying a quality of service threshold. The processor can enable the media device to access the aggregated media services.

One embodiment of the subject disclosure includes a media device having a memory to store computer instructions, and a processor coupled with the memory. The processor, responsive to executing the computer instructions, performs operations including obtaining a first image captured by a camera coupled with the media device, where the first image is captured of a viewing area of the media device, and where the viewing area includes a plurality of users. The processor can apply facial pattern recognition to the first image to detect first facial objects in the first image, where the first facial objects correspond to the plurality of users. The processor can identify a group of content service systems associated with subscription plans for the plurality of users and can provide the first facial objects to the group of content service systems for authentication and access to a group of media services from the group of content service systems, where redundant media services among the group of media services are filtered out to generate aggregated media services. The processor can provide the aggregated media services at the media device and can obtain a second image captured by the camera, where the second image is captured of the viewing area. The processor can apply the facial pattern recognition to the second image to detect second facial objects in the second image and can compare the first facial objects with the second facial objects to detect an additional facial object corresponding to an additional user that was not among the plurality of users. The processor can identify an additional content service system associated with an additional subscription plan for the additional user and can provide the additional facial object to the additional content service system for authentication and access to an additional media service from the additional content service system, where the additional media service is included in the aggregated media services to generate adjusted aggregated media services. The processor can provide the adjusted aggregated media services at the media device.

One embodiment of the subject disclosure is a method that includes obtaining, by a server, a group of facial objects detected from an image captured by a camera coupled with a media device, where the facial objects correspond to a plurality of users. The method includes determining, by the server, authentication information for each of the plurality of users based on the facial objects. The method includes providing, by the server, the authentication information to a group of content service systems for enabling the media device to access aggregated media services from the group of content service systems. The method includes monitoring, by the server, utilization of the aggregated media services at the media device. The method includes determining, by the server, a fee for the utilization of the aggregated media services at the media device based on the monitoring. The method includes apportioning the fee among the plurality of users to generate a group of apportioned fees, and providing the group of apportioned fees to service provider billing systems associated with subscription plans for the plurality of users.

Figure 1:
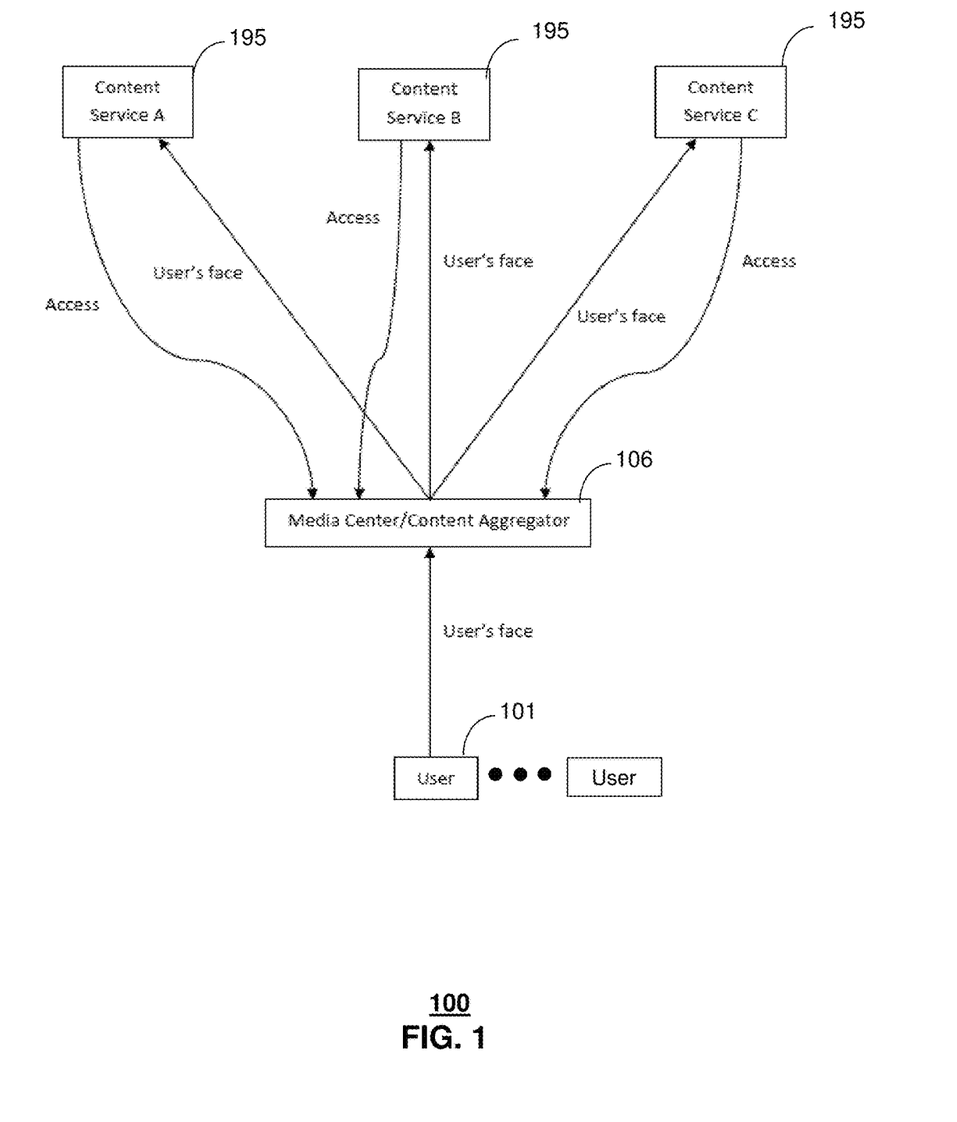
FIGS. 1, 2A and 2B depict illustrative embodiments of a system for providing aggregated media services.

FIG. 1 depicts an illustrative embodiment of a communication system 100 that can provide communication services, including aggregated media services from any number of content service systems 195 based on authentication information associated with any number of users 101. The communication services can be provided at a communication device, such as a media center/content aggregator which can be a media device 106. The media device 106 can be various types of computing devices, including a set top box, a personal computer, a mobile device, and so forth. The communication services, which include the aggregated media services, can be various types of services, including voice, video and/or data services. As an example, the communication services and/or the aggregated media services can include providing access to media content such as audio content, moving image content such as 2D or 3D videos, video games, virtual reality content, still image content, and combinations thereof through various means including broadcast, multicast, and/or unicast, including video-on-demand. The services can also include voice and/or video calls and/or conferencing, accessing and/or sharing personal media content, internet access, interactive services (e.g., interactive internet protocol television services, cable and/or satellite services), and so forth.

In one embodiment, system 100 can allow a single user to access his or her media services at a remote location via image pattern recognition (e.g., facial objects of the user) applied to one or more images captured of the single user at the remote location. The image pattern recognition can be utilized for authentication of the single user so that one or more media devices at the remote location can access media services for the single user (e.g., media services that are associated with a subscription for the single user at a different location).

In one embodiment, system 100 can allow multiple users to access their media services (or a portion thereof) at a remote location via image pattern recognition (e.g., facial objects of the users) applied to one or more images captured of the users at the remote location. The image pattern recognition can be utilized for authentication of the users so that one or more media devices at the remote location can access media services (or portions thereof) for the users (e.g., media services that are associated with subscriptions for the users at a different locations and/or different service providers).

The communication system 100 can provide for a decentralized process, in which captured or otherwise retrieved authentication data (e.g., a facial object generated from a captured image of the face of user 101) can be sent directly from the media center/content aggregator of the media device 106 to various content service systems (or source devices) 195 and used in place of the authentication information (e.g., user ID and password) of the user. The authentication can be performed for any number of users and at any time, including periodically, responsive to a request, and/or responsive to a triggering mechanism such as user motion detection or user sound detection when a new user enters a viewing area of the media device 106.

In one or more embodiments, the media device 106 can perform image pattern recognition to detect and extract facial objects for users from one or more images captured or otherwise retrieved by the media device (e.g., via a camera coupled thereto). In one or more embodiments, the content service system 195 that receives the facial objects can additionally perform image pattern recognition to compare the facial objects with stored facial objects in order to authenticate the user 101.

In one or more embodiments, this exemplary process can be performed without third party action or involvement. For instance, an ID and password (or other authentication information) of the user 101 may be known only to the user and the content service system(s) 195. In one or more embodiments, this exemplary process can request or otherwise determine content service systems 195 to which a user 101 is subscribed. For example, a user 101 can manually (e.g., via user input such as a text input and/or voice command) identify their content service and corresponding content service systems 195 so that the facial object or other captured authentication data can be transmitted to the identified content service systems 195.

In another example, other techniques can be utilized to determine the content service systems 195 to which to send the captured authentication data (e.g., facial object), such as based on a probability of subscription such as where one or more content service systems have a large market share of subscribers in the particular location. Another technique for determining the appropriate content service systems 195 of the user 101 can include monitored history. For instance, the media device 106 may identify the user, such as based on the facial object, and may consult stored history information for that user, including content service system requests sent out in the past. The stored history information can be located at the media device 106 and/or stored remotely, such as at a remote server.

Once the authentication data (e.g., facial objects) is provided from the media device 106 to the content service system(s) 195 and the authentication based on the facial objects or other authentication data is performed (e.g., via an image pattern recognition comparison with stored facial objects for the user 101), then access to the media services can be enabled for the user at the media device 106. For example, the access can be enabled directly from the content service system 195 to the media device 106. In another embodiment, the access to the media service can be enabled in conjunction with other media services of other users that have been authenticated via the media device 106 to generate aggregated media services at the media device. The aggregated media services can be generated in conjunction with any number of content service systems 195 and any number of users 101 that have been authenticated at the premises where media device 106 is located.

In one or more embodiments, the aggregated media services can be generated from multiple content service systems that authenticate multiple users 101 based on selections of media services from among available media services. For instance, a group of users 101 can be authenticated (e.g., directly) by a group of content service systems 195 via facial object recognition for available services at the group of content service systems. The group of users 101 can make selections of desired services from among the available services and the selections can be bundled into aggregated media services that are provided to the media device 106. The desired services selection can be made in a number of different ways. For instance, the media device 106 can receive service options from the group of content service systems 195 and can present the service options in a Graphical User Interface (GUI). The GUI can be in various formats and can include samples of the service, such as thumbnails, video clips, icons, and so forth.

In one or more embodiments, the service options can also include recommendations for services. The recommendations for media services can be based on various criteria, including user profile information, individual account recommendations, previous group viewing history, contextual information, and so forth. The service recommendations and service options can also include other information such as cost and/or billing information (e.g., apportioned billing or single billing to a single subscriber plan) and can be based on other factors such as network load, bandwidth availability, and so forth.

In one or more embodiments, redundant media services can be filtered out of the selection options and/or the aggregated media services. For example, a first user 101 may have a first services subscription that includes broadcast channels and video gaming. A second user 101 may have a second services subscription that includes video gaming and telephone services. Aggregated media services can be generated that include the broadcast channels and the video gaming from the first services subscription and the telephone services from the second services subscription, where the video gaming of the second services subscription is filtered out as being redundant. The factors for determining which redundant services to retain and which to filter out can vary and can include satisfying a quality of service threshold (e.g., based on image quality and/or streaming quality), cost, network traffic or conditions, and so forth. For example, monitoring of the network can be performed and various devices within the network (including end user devices, service provider devices, and so forth) can retrieve predetermined and/or dynamically generated quality thresholds (or other thresholds), so that the monitored data can be compared with the thresholds for making a filtering determination. For instance and continuing with the above example, the video gaming of the second services subscription may have been filtered out based on a determination that the video gaming is more expensive or there are network issues with the particular content service system that results in increased latency.

In one or more embodiments, the filtering of redundant media services of the aggregated media services can be an on-going process such that the selected redundant media service is monitored to provide for maintaining the criteria that caused it to be selected (e.g., satisfying image and stream quality threshold). In this example, if the monitoring determines that the selected redundant media service is no longer satisfying the selection criteria then a previously filtered out media service (from a different content service system 195) can replace the selected redundant media service. For instance, a list of available but filtered out services can be stored and accessed upon a detection that a threshold is no longer being met by one of the services. A transfer of that service with one of the available but filtered out services (e.g., a comparable service type such as both being VOD services) can then be performed.

Figure 2A:
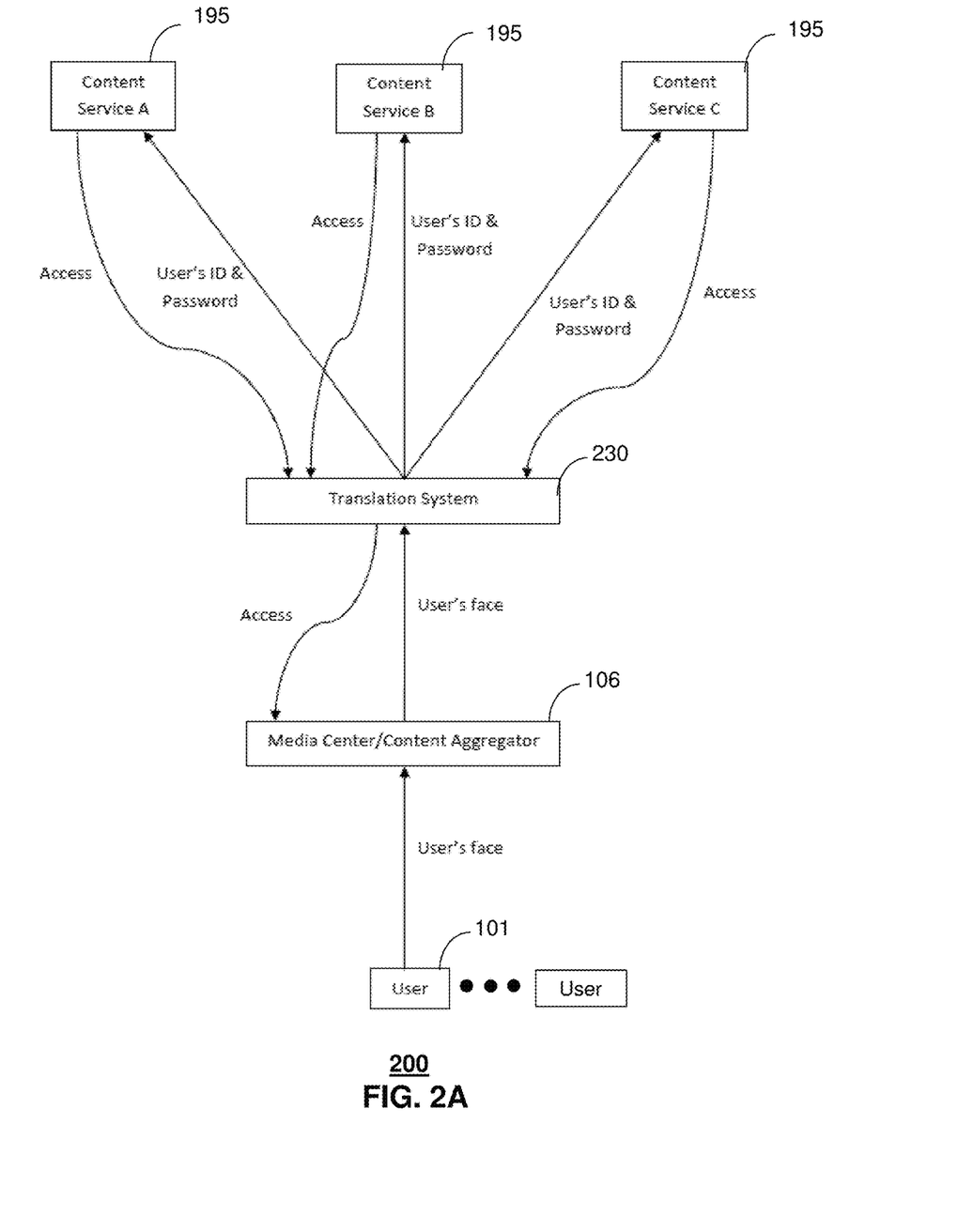
Figure 2B:
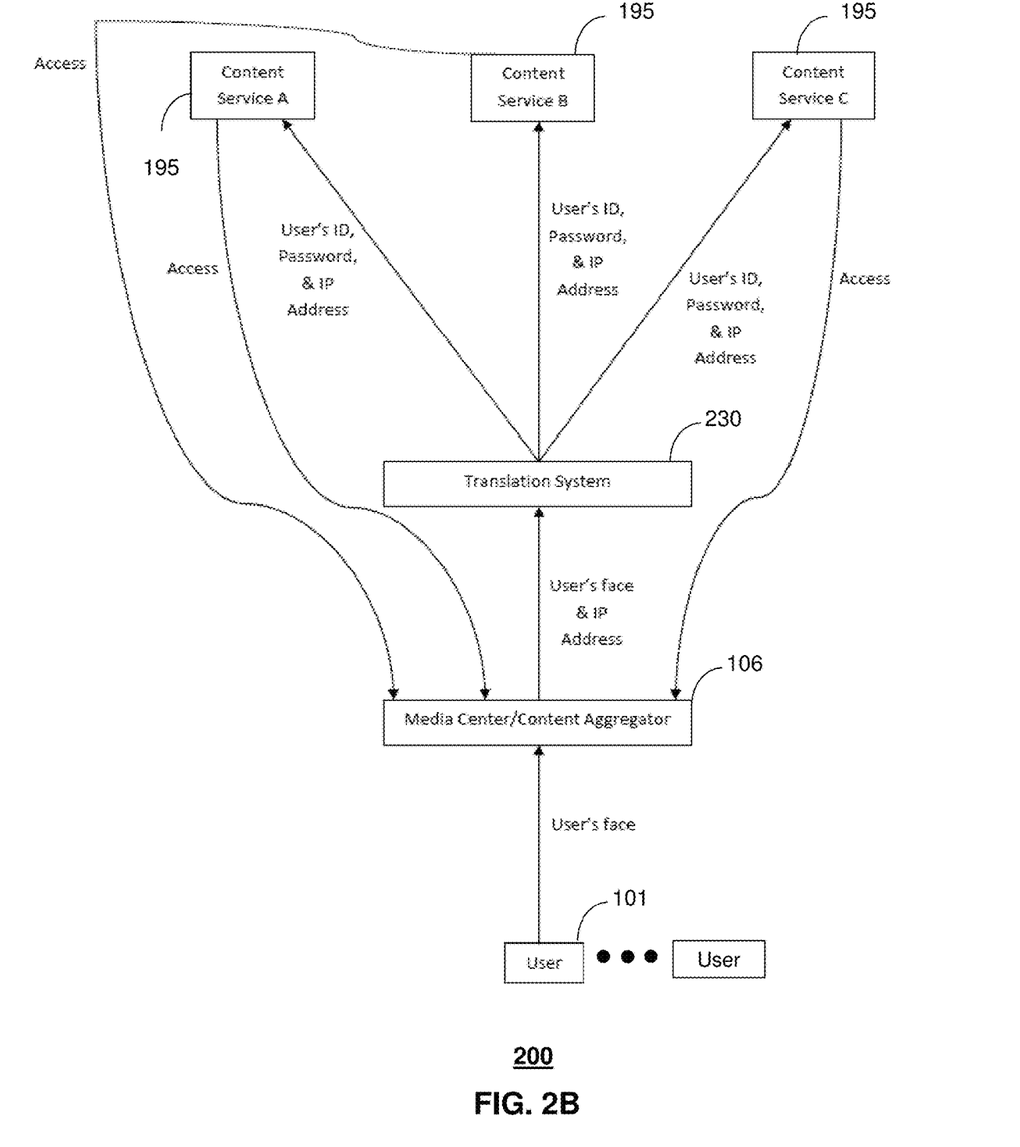

FIGS. 2A and 2B depict illustrative embodiments of a communication system 200 that can provide communication services, including aggregated media services from any number of the content service systems 195 based on authentication information associated with any number of the users 101. The communication services can be provided at the media device 106. System 200 can represent a centralized process, where the captured or otherwise retrieved authentication data (e.g., a facial object generated from a captured image of the face of user 101) can be provided from the media device 106 to a translation system 230 which uses the authentication data to lookup or otherwise identify authentication information (e.g., login and password) for each service for which the user has a subscription. In one or more embodiments, an identification of desired services and/or the corresponding authentication information can be sent directly to the content service systems 195 or they can be sent back to the media center/content aggregator of media device 106.

In one example, if the identification of desired services and/or the corresponding authentication information (e.g., user ID and password identified from the facial objects) are sent directly to the content service systems 195 from the translation system 230, the media center/content aggregator of media device 106 can access the service(s) in a number of different ways. For instance, the media center/content aggregator of media device 106 can utilize the translation system 230 for obtaining access to the aggregated content service such that the access is by way of the translation system as shown in FIG. 2A. In this example, the aggregation of the media services from the multiple content service systems 195 can be performed at the translation system 230, at the media device 106 or at both (e.g., in a distributed process such as the translation system aggregating all services associated with video and data and the media device aggregating all services associated with voice). In one embodiment, the translation system 230 can monitor use of the aggregated media services so that historical information can be maintained, such as to generate future recommendations for media services to be included in future aggregated media services.

In another example, the translation system 230 can receive (or otherwise determine) the IP address of the media device 106 and provide the media device's IP address along with the determined authentication information (e.g., user ID and password) to the corresponding content service systems 195 to allow or otherwise enable the media center/content aggregator of the media device 106 to access each of the media services directly as shown in FIG. 2B. In yet another embodiment, the user ID and password (or other authentication information) which are determined by the translation system 230 from the facial objects (or other authentication data) can be sent back to the media center/content aggregator of the media device 106 so that the content service systems 195 can be accessed directly by the media device 106 (via the media device sending the user ID and password directly to each of the content service systems).

In one or more embodiments, the translation system 230 can be owned, managed or otherwise operated by a third party (e.g., a remote server or group of remote servers), by an entity that also acts as one of the content service systems 195, and/or by a collection of content service systems that work cooperatively to streamline access to all or a portion of their services. In one or more embodiments, the user 101 can be provided with a desired level of anonymity in obtaining the media service(s). For instance in one embodiment, the face (or other captured authentication data) of user 101 may only be known (e.g. stored for purposes of performing an image pattern recognition comparison) by the translation system 230 and not by the content service system 195.

In one or more embodiments, a user 101 can access their services, such as part of an aggregated media service that includes services of other users, without the user having their own device(s) with them when the user is accessing the content service from alternate locations (e.g., via media device 106). In one or more embodiments, a user 101 can access their services, without the need to update authentication information and/or without the need to update software on a device to receive the services.

Figure 3:
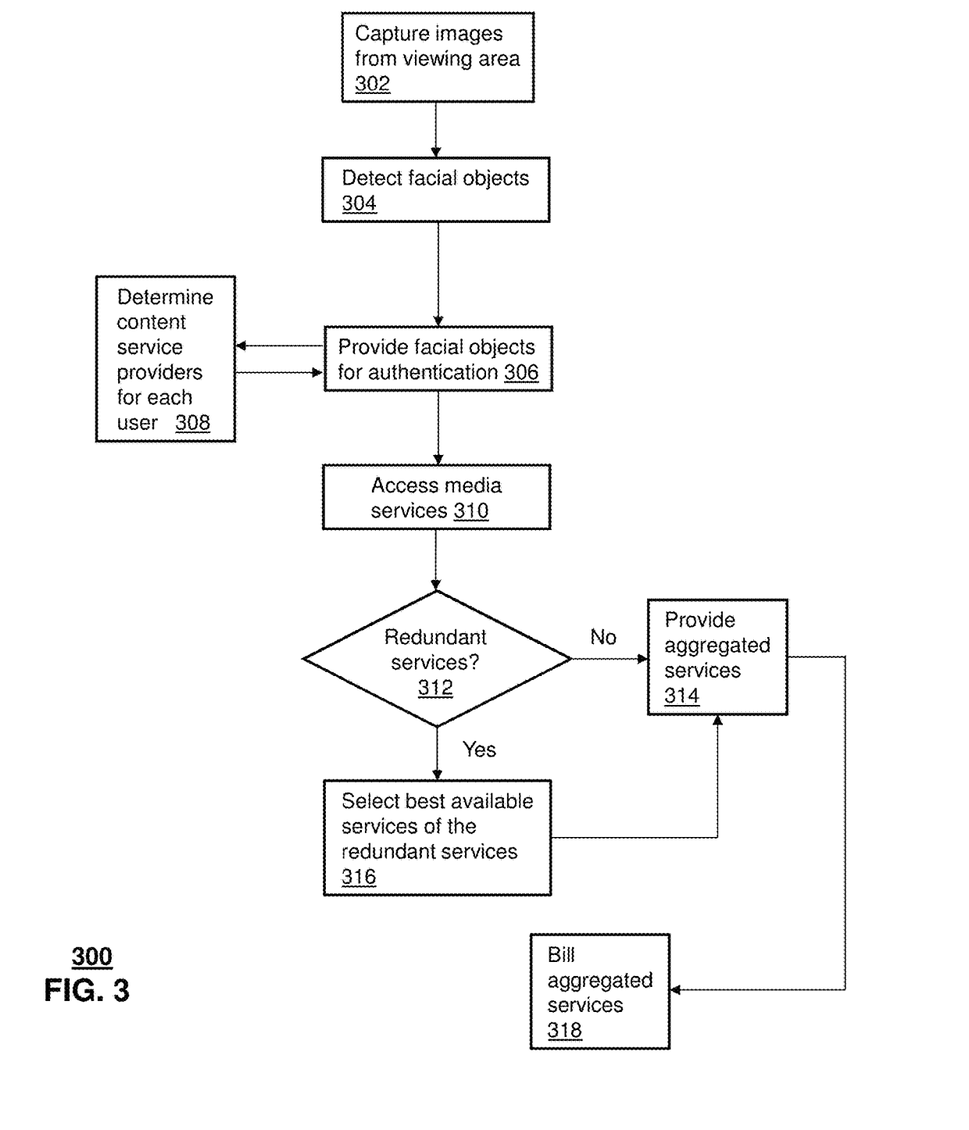
FIG. 3 depicts an illustrative embodiment of a method operating in portions of the systems described in FIGS. 1, 2A and 2B.

FIG. 3 depicts an illustrative embodiment of a method 300 that can be performed by one or more of the devices of systems 100 and 200, as well as other devices described in this disclosure. Method 300 can be performed with more or less than the steps illustrated in FIG. 3 and the exemplary embodiments can include rearranging of these steps. Method 300 or portions thereof can also be combined with other functions or techniques described with respect to the exemplary embodiments. Method 300 can begin at 302 where authentication data is captured or retrieved with respect to the media device 106. For instance, the media device 106 can be a set top box coupled with a camera that captures image(s) of a viewing area (e.g., a living room) of the media device. At 304, the image can be analyzed, such as through use of facial pattern recognition, to detect facial objects for each of the users. The image analysis can occur at the media device 106 and/or at another device, such as at one or both of the translation system 230 and the content service systems 195.

At 306, the facial objects can be utilized for authentication of the user for the media services. For example, stored facial objects can be retrieved and compared with the captured facial objects to detect a match and determine corresponding authentication information (e.g., a user ID and password) from that match. In one or more embodiments, the determined authentication information, such as a user ID and password, can be provided to the content service systems 195 for authorization and enabling access to the media services. In other embodiments, the facial pattern recognition comparison can be performed by the content service systems 195. In one or more embodiments, the facial pattern recognition comparison can be facilitated based on other information obtained by the media device 106. The other information that facilitates the facial object comparison can be user input (e.g., a text input or a voice signal that provides additional identifying information). The other information can be image information associated with the viewing area, such lighting conditions, detected movement of the user during the image capture, and so forth. In one or more embodiments, an authentication failure can trigger capturing one or more additional images. In one embodiment, instructions can be generated and presented at the media device when an authentication failure has occurred, such as instructing a user to manually provide additional identification information or instructing a user to change his or her position within the viewing area so that another facial object can be captured of the user.

In one or more embodiments at step 308, a determination or identification of content service systems 195 or preferred content service systems can be made. For example, if the media device 106 is performing the facial pattern recognition to generate the facial objects for transmitting directly to a group of content service systems, then the media device 106 can also determine the content service systems 195 to which the facial objects are to be transmitted. This determination can be performed in a number of different ways, including requesting user input (e.g., text input and/or voice inputs), analyzing past media services that were authenticated at the media device, performing an initial facial pattern recognition comparison utilizing facial objects stored at the media device that are indexed to content service systems utilized in the past, and so forth.

At 310, access to the media services can be enabled by the group of content service systems according to the authentication process of steps 302-306. At 312, a determination can be made as to whether there are redundant media services that are being enabled for the group of users from the multiple content service systems. The redundancy can be measured at different levels and does not need to be exactly the same media services. For instance, first and second video-on-demand services that include high-definition movies that are new releases may be determined to be redundant even though there may be different movies available with each of the services. In one or more embodiments, the redundancy can be measured based on a degree of redundancy that considers the percentage of overlap between the services, such as the percentage of the same movies accessible, the percentage of the same video games accessible, and so forth. If it is determined that there is no redundancy in media services among the aggregated media services then at 314 the aggregated media services can be made available at the media device 106. If on the other hand, a redundancy of media services is identified then at 316 a filtering process can be applied to the redundant media services to select one of the redundant media services. The criteria applied for the selection among the redundant media services can vary and can be based on one or more of quality (e.g., image quality and/or streaming quality), cost, network conditions, service provider agreements, user profiles, user preferences, and so forth.

At 318, billing for the aggregated services can be performed. The billing can be performed in a number of different ways. For example, the content delivery cost can be apportioned amongst the users or a portion thereof to share the percentage of the cost associated with their usage. In one embodiment, a billing system can charge the appropriate amount (e.g., based on user input) to each user participant and then pass that along to the individual responsible for paying the network provider or to the network provider directly. In another embodiment, the content delivery cost can be apportioned equally to all of the users. In yet another embodiment, one or more users of the group of users can be apportion some of the bill even though the one or more users did not utilize their subscription plan or their corresponding services system 195 for providing the aggregated media services (e.g., where all of the media services available to the one or more users was redundant services that were filtered out because a better available service was chosen). In one or more embodiments, the costs associated with media content (e.g., a video-on-demand licensing charge for a new release) can be apportioned amongst the users or a portion thereof, similar to the apportioning described with respect to the content delivery costs.

In one or more embodiments, method 300 can generate recommendations for the aggregated media services. The recommendations can be based on various information and factors, including user profile information, individual account recommendations, previous group viewing history, contextual information, and so forth. This type of information may be employed to provide recommendations at a higher level as well. Rather than suggesting specific content, the method 300 can also recommend content types, genres, sources, and so forth.

In one or more embodiments, other identification techniques can be utilized, in combination with the facial recognition or in place of the facial recognition, such as other forms of biometric identification (e.g. voice, fingerprint, and so forth), mobile device identification, user input of a username and password (e.g., via text input or voice command), and so forth.

Figure 4:
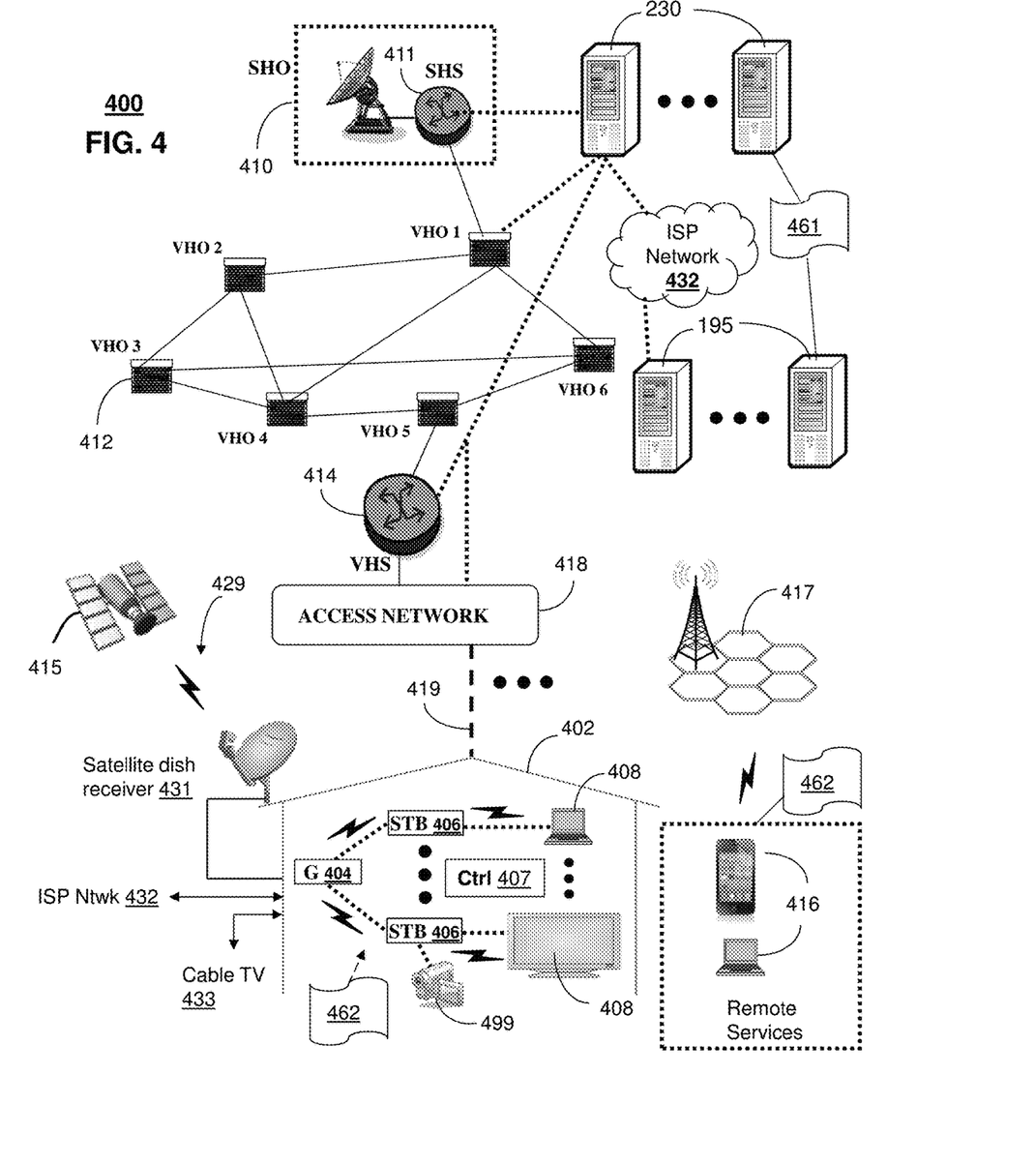
FIG. 4 depicts an illustrative embodiment of a communication system that provides aggregated media services.

FIG. 4 depicts an illustrative embodiment of a communication system 400 for delivering media services. The communication system 400 can represent an interactive television system, including an Internet Protocol Television (IPTV) media system. Communication system 400 can be overlaid or operably coupled with one or more of systems 100 and 200 as another representative embodiment of communication system 400.

In one or more embodiments, communication system 400 can provide aggregated media services at one or more communication devices based on available services to a group of users, such as based on subscription plans for the users. The communication system 400 can enable authentication based on facial objects, biometric parameters and/or other identification information. In one or more embodiments, the authentication can be performed without the user(s) providing user inputs, such as passwords and/or identification information. In another embodiment, the authentication can be based on image and/or voice recognition with or without user inputs.

As an example, communication system 400 can enable obtaining a group of facial objects detected from an image captured by a camera 499 coupled with a communication device (e.g., media processor 406). For instance, the image can be captured of a viewing area of the communication device (e.g., periodically, responsive to a request from a voice command or user input, and/or responsive to a triggering event such as detecting motion and/or sound of a user(s) in the vicinity), where the viewing area can include any number of users, and the facial objects can correspond to the plurality of users. In this example, the communication system 400 can enable determining identification information for each of the plurality of users based on the facial objects and identifying a group of content service systems associated with subscription plans for the plurality of users based on the identification information. Continuing with this example, the communication system 400 can enable determining authentication information for each of the plurality of users based on the identification information, and providing the authentication information to the group of content service systems for permitting access to a group of media services from the group of content service systems. Communication system 400 can enable filtering out redundant media services among the group of media services to generate aggregated media services. The filtering can be based on various criteria such as choosing a selected redundant media service from among the redundant media services for inclusion in the aggregated media services based on satisfying a quality of service threshold.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content service system.

Some of the network elements of the IPTV media system can be coupled to one or more computing devices 230, a portion of which can operate as a web server for providing web portal services over the ISP network 432 to wireline media devices 408 or wireless communication devices 416.

Communication system 400 can also provide for all or a portion of the computing devices 230 to function as a translation system. The translation system 230 can use computing and communication technology to perform function 461, which can include among other things, determining authentication information (e.g., user ID and password) from received authentication data (e.g., facial object) and providing the authentication information to one or more content service systems 195 to enable media services that may be aggregated to generate an aggregated media services. The media processors 406 and wireless communication devices 416 can be provisioned with software function 461 to utilize the services of translation system 230 for authentication and access to the aggregated media services supplied by one or more of content service systems 195. In one embodiment, the mobile communication device 416 can be passed amongst the users to capture an image of each user so that the images can be processed to enable the aggregated media services to be delivered to the mobile device. In this example, the aggregated media services can be shared with other communication devices, such as set top boxes and/or personal computers that are associated with the mobile device 416

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

In one or more embodiments, the aggregated media services can include communications via an IP Multimedia Subsystem (IMS) network architecture to facilitate the combined services of circuit-switched and packet-switched systems.

Figure 5:
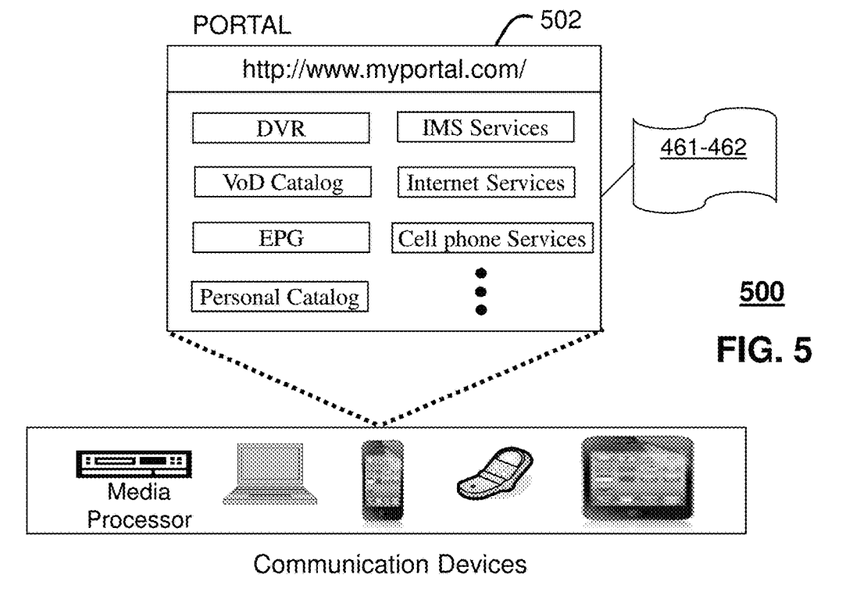
FIG. 5 depicts an illustrative embodiment of a web portal for interacting with the communication systems of FIGS. 1, 2A, 2B and 4.

FIG. 5 depicts an illustrative embodiment of a web portal 502 which can be hosted by server applications operating from the computing devices 230 of the communication system 400 illustrated in FIG. 4. In one or more embodiments the web portal can be utilized in conjunction with the aggregated media services being provided by the content service systems 195. For example, the web portal 502 can enable users to select services (e.g., user(s) desired services) from among available services of the content service systems 195 to generate the aggregated media services. In another embodiment, the web portal 502 can enable a user to provision the translation system 230 and/or a memory device accessible by the media device 106, with information that facilitates the authentication process described with respect to method 300. For instance, a user can upload an image or a facial object that can be stored so that a facial pattern recognition comparison can be performed to identify the corresponding authentication information (e.g., user ID and password) of the user. In another embodiment, the web portal 502 can be provided with user preferences for storage, such as for generating recommendations, billing practices, designating devices that can participate in the aggregated media services, and so forth. In one or more embodiments, apportioned billing can be reviewed at the web portal 502 so that a user can determine (or approve) the apportioning of the bill, such as based on user usage or other apportioning techniques.

The web portal 502 can be used for managing services of communication systems 400-500. A web page of the web portal 502 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2B. The web portal 502 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 502 can also be used for provisioning IMS services described earlier, provisioning Internet services, provisioning cellular phone services, and so on.

The web portal 502 can further be utilized to manage and provision software applications 461-462 to adapt these applications as may be desired by subscribers and service providers of communication systems 100, 200 and 400.

Figure 6:
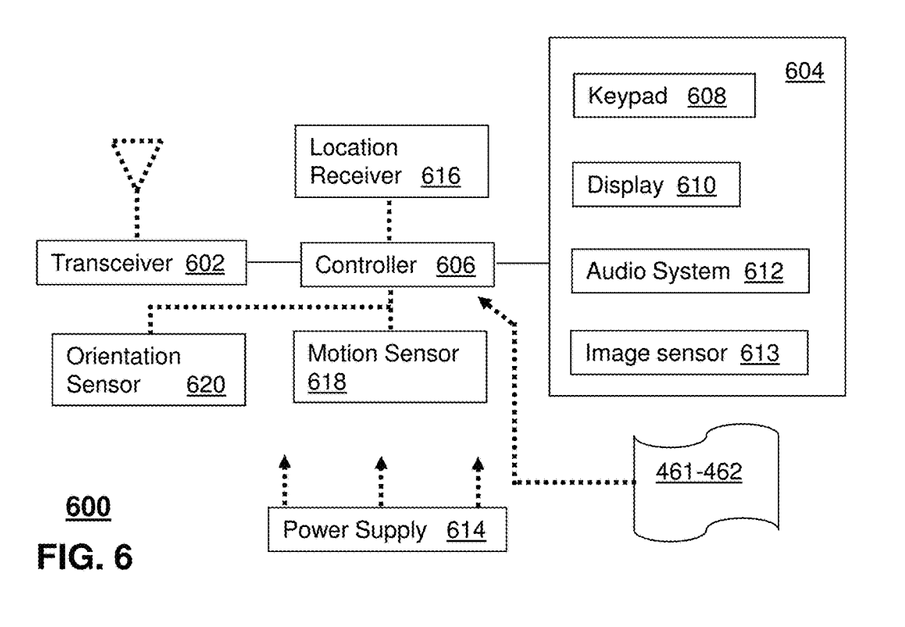
FIG. 6 depicts an illustrative embodiment of a communication device.

FIG. 6 depicts an illustrative embodiment of a communication device 600. Communication device 600 can serve in whole or in part as an illustrative embodiment of the devices or components of the systems depicted in FIGS. 1, 2A, 2B and 4. For example, communication device 600 can obtain a first image captured by a camera coupled with the device, where the first image includes a plurality of users. The communication device 600 can apply facial pattern recognition to the first image to detect first facial objects in the first image, where the first facial objects correspond to the plurality of users. The communication device 600 can identify a group of content service systems associated with subscription plans for the plurality of users, and can provide the first facial objects to the group of content service systems for authentication and access to a group of media services from the group of content service systems. The communication device 600 can provide the aggregated media services at the media device, can obtain a second image captured by the camera, and can apply the facial pattern recognition to the second image to detect second facial objects in the second image. The communication device 600 can compare the first facial objects with the second facial objects to detect an additional facial object corresponding to an additional user that was not among the plurality of users. The communication device 600 can identify an additional content service system associated with an additional subscription plan for the additional user, and can provide the additional facial object to the additional content service system for authentication and access to an additional media service from the additional content service system, where the additional media service is included in the aggregated media services to generate adjusted aggregated media services. The communication device 600 can provide the adjusted aggregated media services at the media device.

To enable these features, communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 400 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the media device 106, the media processor 406, the media devices 408, or the portable communication devices 416 of FIGS. 1, 2A, 2B and 4. It will be appreciated that the communication device 600 can also represent other devices that can operate in communication systems 100-200 and 400 such as a gaming console and a media player.

The communication device 600 shown in FIG. 6 or portions thereof can serve as a representation of one or more of the devices or components of FIGS. 1, 2A, 2B and 4. In addition, the controller 606 can be adapted in various embodiments to perform the functions 461-462.

Upon reviewing the aforementioned embodiments, it would be evident to an artisan with ordinary skill in the art that said embodiments can be modified, reduced, or enhanced without departing from the scope of the claims described below. For example, the aggregated media services can be provided to a group of communication devices (e.g., a group of media devices) at a premises or other location (or multiple locations). For example, aggregated media services can be generated as described in the exemplary embodiments based on services available to a group of users and then the aggregated media services can be made available at a premises such that multiple media services are concurrently being utilized at different media devices 106 of the premises. As an example, the aggregated media services can include video-on-demand, video gaming and video conferencing services. Based on these aggregated media services, one or more first users can watch a movie at a set top box of the premises while one or more second users play a video game at a gaming console of the premises, and additionally while one or more third users participate in a video conference via a mobile phone present at the premises. This example can include any number of communication devices providing any number of services (of any type of communication services) via the aggregated media services. In this example, the billing for services can be processed in a number of different ways such as being apportioned to multiple users based on their individual use of the services which can result in an unequal apportioning or being apportioned equally to each of the users whose available services were utilized in generating the aggregated media services.

In another example, the aggregated media services can be generated as described in the exemplary embodiments and utilized in more than one location. For instance, the aggregated media services can be made available at the premises where the authentication information (e.g., facial objects from image(s)) was captured and also made available at premises of all or some of the users (e.g., visiting users) whose available services are utilized in generating the aggregated media services. In another embodiment, one or more other locations can be designated (e.g., via user input, user preferences, subscriber plans, and so forth) for delivery of the aggregated media services. Time limits or other triggering mechanisms can be implemented to cease the access to the aggregated media services, such as ceasing the aggregated media services at the other locations when the aggregated media services are no longer being utilized at the primary location (where the authentication information was obtained).

In another example, recommendations for media services (e.g., in generating the aggregated media services and/or in selecting a use of a service that has been included in the aggregated media services) can be determined based on the captured image(s) or other monitored activity of the users. The recommendations can be generated locally, such as by the media device 106, and/or can be generated remotely by another device (e.g., the translation system 230 and/or a content service system 195). As an example, image pattern recognition can be applied to a captured image to detect that one or more users of the group of users are wearing football jerseys associated with a particular team (e.g., in addition to detecting the facial objects of the group of users for generating the authentication information). A recommendation can be generated to include as part of the aggregated media services access to a football channel broadcasting the team's game, or the recommendation can be to present the football channel that has already been included in the aggregated media services.

Other monitored activity of the group of users can also be utilized for generating recommendations. For instance, voice recordings can be generated and analyzed for conversations between the users where the analysis determines subject matters of interest. As an example, the group of users can be having a discussion regarding a movie that they would like to see which is still being played in the movie theatres. The discussion (or parts thereof) can be captured and analyzed to identify the movie being discussed. A recommendation can then be generated based on the movie, such as related movies available via the aggregated media services, other movies having the same actor(s) that are available via the aggregated media services, internet access (via the aggregated media services) to a website that provides discounted tickets or a review of the movie, and so forth.

In another example of the monitored activity utilized for generating recommendations, use of the aggregated media services can be monitored and analyzed to generate recommendations for other services to be added or deleted from the aggregated media services. For example, the group of users can be watching a movie that is made available via the aggregated media services and based on that movie a recommendation for adding video game services to the aggregated media services can be generated where the video game services includes a video game related to the movie. As another example, a lack of use of a service in the aggregated media services can result in generating a recommendation to remove the service from the aggregated media services. In another example, user input at a media device (e.g., drafting an email, a words spoken during a voice call, text of a SMS message, and so forth) can be analyzed (e.g., identifying a subject matter or a user's desire) to determine a recommendation as to adding a service to the aggregated media services and/or utilizing a service that is already included in the aggregated media services.

In one or more embodiments, a selection and/or filtering from among available services can be based on a cost analysis which is performed with or without user intervention. For example, a determination can be made that one of the services that the user(s) desire or are otherwise requesting is internet access at a threshold speed. A cost determination can be made that detects that a first internet access service satisfies the speed threshold but is at a lower cost than a second internet access service that also satisfies the speed threshold. The first internet access service can be selected (resulting in the second internet access service being filtered out) based on the detection of the lower cost. The selection can be automatic (e.g., based on stored user preferences) and/or can be based on user input, such as presenting the filtering option along with the cost differential.

In one or more embodiments, as new user(s) enter a room, more service options can be added that are associated with the new user. For instance, a group of users can be utilizing aggregated services that are associated with one or more members of the group. A new user may enter the room who has access to a unique service that is not included in the aggregated services. An option can be presented that notifies the users that this new service is now available due to the entry of the new user into the viewing area. If selected, the new service can be added to the aggregated services to generated adjusted aggregated services. The new service can be of various types (e.g., voice, video and/or data).

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
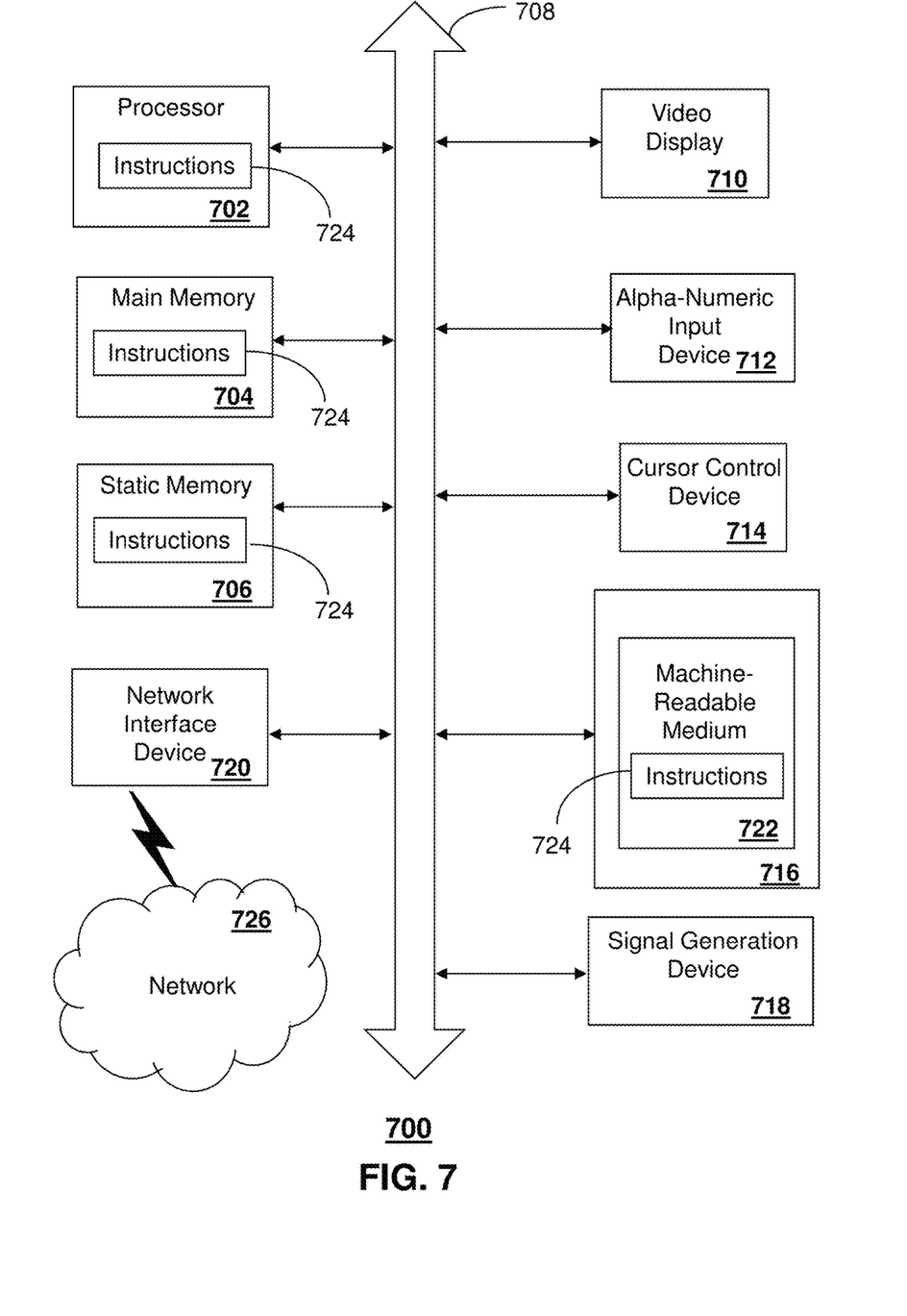
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods describe above. One or more instances of the machine can operate, for example, as the media device 106, the translation system 230, the media processor 406, the mobile device 416 and other devices or components of FIGS. 1-6 to perform various functions including identifying user ID and passwords from facial objects of a group of users and aggregating media services for a group of content service systems associated with the group of users.] In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
    a processing system including a processor; and
    a memory that stores executable instructions that, when executed by the processing system, facilitate performance of operations, comprising:
    authenticating a plurality of users in response to identifying the plurality of users within a viewing area of a media device and verifying user-generated input, wherein identifying the plurality of users comprises capturing an image of the viewing area and using facial pattern recognition to identify each of the plurality of users, wherein the user-generated input comprises a voice signal for each of the plurality of users, and wherein the verifying user-generated input comprises identifying the voice signal for each of the plurality of users;
    in response to the authenticating, determining a group of media services and a history of prior access to the group of media services by the plurality of users according to subscription plans for the plurality of users; and
    filtering out redundant media services among the group of media services to generate aggregated media services, wherein the filtering out of the redundant media services includes choosing a selected redundant media service from among the redundant media services for inclusion in the aggregated media services based on satisfying a quality of service threshold.

2. The device of claim 1, wherein the choosing of the selected redundant media service comprises choosing the selected redundant media service among the redundant media services for inclusion in the aggregated media services based on satisfying a cost threshold.

3. The device of claim 2, wherein the operations comprise:
    monitoring a cost for the selected redundant media service during utilization of the selected redundant media service;
    detecting the cost for the selected redundant media service failing to satisfy the cost threshold; and
    responsive to the detecting, replacing the selected redundant media service with another selected redundant media service from among the redundant media services that were filtered out.

4. The device of claim 1, wherein the choosing of the selected redundant media service comprises choosing the selected redundant media service among the redundant media services for inclusion in the aggregated media services based on satisfying a network condition threshold.

5. The device of claim 4, wherein the operations comprise:
    monitoring a network condition for the selected redundant media service during utilization of the selected redundant media service;
    detecting the network condition for the selected redundant media service failing to satisfy the network condition threshold; and
    responsive to the detecting, replacing the selected redundant media service with another selected redundant media service from among the redundant media services that were filtered out.

6. The device of claim 1, wherein the quality of service threshold is one of an image quality threshold and a streaming quality threshold.

7. The device of claim 1, wherein the operations comprise:
    monitoring a quality of service for the selected redundant media service during utilization of the selected redundant media service;
    detecting the quality of service for the selected redundant media service failing to satisfy the quality of service threshold; and
    responsive to the detecting, replacing the selected redundant media service with another selected redundant media service from among the redundant media services that were filtered out.

8. The device of claim 1, wherein the choosing of the selected redundant media service comprises choosing the selected redundant media service among the redundant media services for inclusion in the aggregated media services based on satisfying a user criteria threshold.

9. The device of claim 8, wherein the operations comprise:
monitoring a user criteria for the selected redundant media service during utilization of the selected redundant media service;
detecting the user criteria for the selected redundant media service failing to satisfy the user criteria threshold; and
responsive to the detecting, replacing the selected redundant media service with another selected redundant media service from among the redundant media services that were filtered out.

10. The device of claim 9, wherein the user criteria is one of service provider agreements, user profiles, and user preferences.

11. A machine-readable storage medium, comprising executable instructions that, when executed by a processing system including a processor, facilitate performance of operations, comprising:
authenticating a plurality of users in response identifying the plurality of users within a viewing area of a media device and verifying user-generated input, wherein identifying the plurality of users comprises capturing an image of the viewing area and using facial pattern recognition to identify each of the plurality of users;
in response to the authenticating, determining a group of media services and a history of prior access to the group of media services by the plurality of users according to subscription plans for the plurality of users, wherein the user-generated input comprises a voice signal for each of the plurality of users, and wherein the verifying user-generated input comprises identifying the voice signal for each of the plurality of users; and
filtering out redundant media services among the group of media services to generate aggregated media services, wherein the filtering out of the redundant media services includes choosing a selected redundant media service from among the redundant media services for inclusion in the aggregated media services based on satisfying a cost threshold.

12. The machine-readable storage medium of claim 11, wherein the choosing of the selected redundant media service comprises choosing the selected redundant media service among the redundant media services for inclusion in the aggregated media services based on satisfying a quality of service threshold.

13. The machine-readable storage medium of claim 12, wherein the operations comprise:
monitoring a quality of service for the selected redundant media service during utilization of the selected redundant media service;
detecting the quality of service for the selected redundant media service failing to satisfy the quality of service threshold; and
responsive to the detecting, replacing the selected redundant media service with another selected redundant media service from among the redundant media services that were filtered out.

14. The machine-readable storage medium of claim 12, wherein the quality of service threshold is one of an image quality threshold and a streaming quality threshold.

15. The machine-readable storage medium of claim 11, wherein the choosing of the selected redundant media service comprises choosing the selected redundant media service among the redundant media services for inclusion in the aggregated media services based on satisfying a network condition threshold.

16. The machine-readable storage medium of claim 15, wherein the operations comprise:
monitoring a network condition for the selected redundant media service during utilization of the selected redundant media service;
detecting the network condition for the selected redundant media service failing to satisfy the network condition threshold; and
responsive to the detecting, replacing the selected redundant media service with another selected redundant media service from among the redundant media services that were filtered out.

17. The machine-readable storage medium of claim 11,
monitoring a cost for the selected redundant media service during utilization of the selected redundant media service;
detecting the cost for the selected redundant media service failing to satisfy the cost threshold; and
responsive to the detecting, replacing the selected redundant media service with another selected redundant media service from among the redundant media services that were filtered out.

18. A method, comprising:
authenticating, by a processing system including a processor, a plurality of users in response to identifying, by the processing system and verifying user-generated input, the plurality of users within a viewing area of a media device, wherein the user-generated input comprises a voice signal for each of the plurality of users, and wherein the verifying user-generated input comprises identifying the voice signal for each of the plurality of users;
in response to the authenticating, determining, by the processing system, a group of media services and a history of prior access to the group of media services by the plurality of users according to subscription plans for the plurality of users; and
filtering out, by the processing system, redundant media services among the group of media services to generate aggregated media services, wherein the filtering out of the redundant media services includes choosing a selected redundant media service from among the redundant media services for inclusion in the aggregated media services based on satisfying a user criteria threshold.

19. The method of claim 18, comprising:
monitoring, by the processing system, a user criteria for the selected redundant media service during utilization of the selected redundant media service;
detecting, by the processing system, the user criteria for the selected redundant media service failing to satisfy the user criteria threshold; and
responsive to the detecting, replacing, by the processing system, the selected redundant media service with another selected redundant media service from among the redundant media services that were filtered out.

20. The method of claim 19, wherein the user criteria is one of service provider agreements, user profiles, and user preferences.

* * * * *